Figure 1:
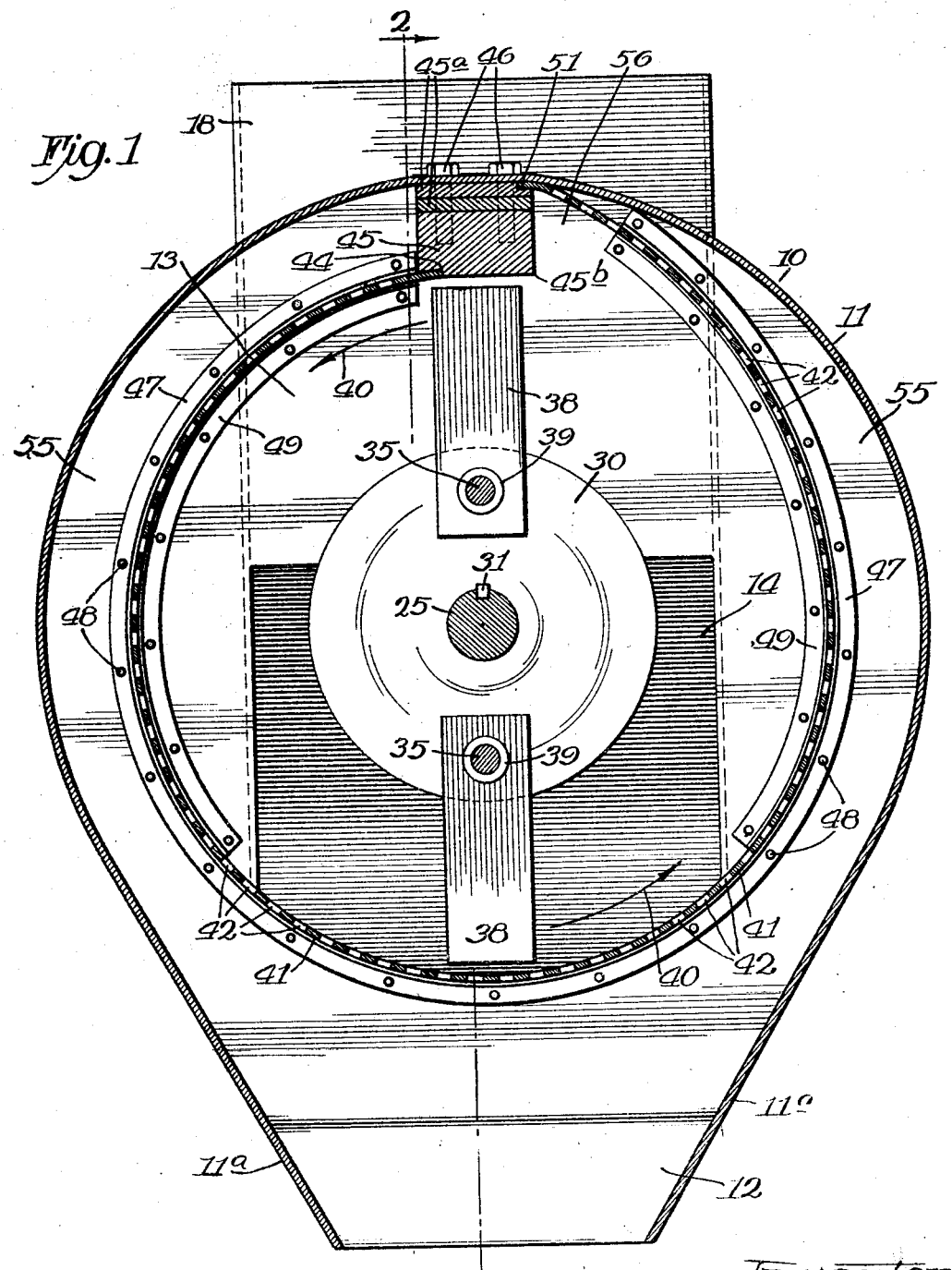

Dec. 23, 1930.  C. POPPELMAN  1,786,262

GRINDER

Filed May 27, 1927  2 Sheets-Sheet 1

Inventor
Carl Poppelman
By Rector, Hibben, Davis & Macauley, Attys

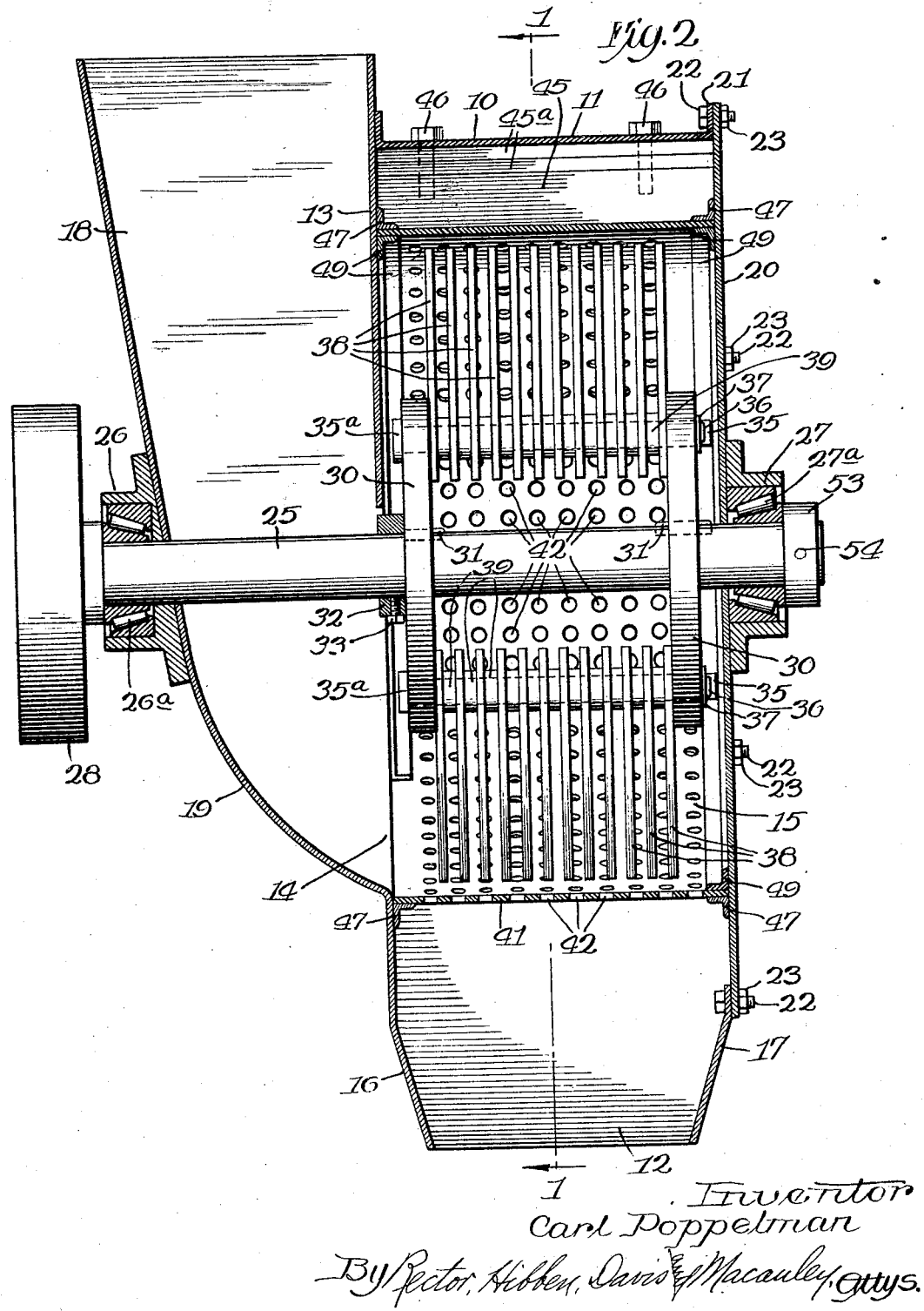

Patented Dec. 23, 1930

1,786,262

UNITED STATES PATENT OFFICE

CARL POPPELMAN, OF RACINE, WISCONSIN

GRINDER

Application filed May 27, 1927. Serial No. 194,597.

This invention relates to improvements in grinders and its purpose is to provide an improved machine adapted for use in grinding various hard materials. The invention may be used with particular advantage in grinding the residue discharged from rendering apparatus in which fats and oils are rendered from animal products, this residue consisting of dried meat scraps, hair, bones and the like. The principal object of the invention is to provide a machine adapted to operate efficiently in breaking up and grinding various hard materials fed thereto. A further object is to provide a grinding machine having rotating grinding elements co-operating with a break bar against which bones or other hard materials are broken. A further object is to provide a grinding machine comprising a pocket in which materials are lodged by the action of the machine, to be broken by the action of movable members cooperating therewith. A further object is to provide a grinding machine having an annular perforated wall through which the ground materials are discharged. Still another object is to provide a grinding machine having a perforated wall or screen of spiral form provided with a stationary break bar interposed between adjacent parts of the spiral for cooperation with movable grinding elements located within the spiral. Still another object is to provide a grinding machine having a removable head to permit the cleaning and replacement of the screen and other parts of the grinding apparatus. Other objects relate to various features of construction and arrangement which will appear more fully hereinafter.

The nature of the invention will be understood from the following specification taken with the accompanying drawings in which one embodiment is illustrated. In the drawings, Figure 1 shows a transverse vertical section taken on the line 1—1 of Fig. 2, and Fig. 2 shows a vertical section taken on the line 2—2 of Fig. 1.

The invention comprises a casing 10 having an outer curved wall 11, the opposite sides of which are extended downwardly as shown at 11$^a$ to form the opposite walls of a discharge chute 12. The outer wall 11 is provided at one end with a vertical wall 13 which is secured thereto in a suitable manner and which is provided in the lower part thereof with an inlet opening 14 through which the materials to be ground are fed into the grinding chamber 15. The lower part of the end wall 13 is continued downwardly at the bottom of the grinding chamber to form the rear wall 16 of the chute 12 and the front portions of the inclined walls 11$^a$ are united by the front wall 17 of the chute. The materials to be ground are fed to the opening 14 through a feed hopper 18 which is attached to the end wall 13 and which terminates preferably above the casing 10. The outer wall of the hopper 18 is inclined downwardly and inwardly and the lower portion thereof is curved inwardly at the lower edge of the opening 14 as shown at 19 so that the materials fed into the hopper are directed by gravity into the grinding chamber. The front wall 20 of the grinding chamber is constructed in the form of a circular metal plate adapted to overlap the flanges 21 of the casing 10 to which the wall 20 is secured by bolts 22 and nuts 23, thus making it possible to remove this front wall readily from the casing when desired.

The grinding member 15 has certain movable grinding elements located therein and actuated by a horizontal shaft 25 the rear end of which is journaled in a bearing 26 secured to the wall of the hopper 18 and fitted with roller bearings 26$^a$ while the forward end thereof is journaled in a bearing 27 secured to the removable front wall 20 and fitted with roller bearings 27$^a$. A pulley 28 is secured on the shaft 25 adjacent the bearing 26 and is adapted to be connected by a belt with a motor or other source of power. The shaft 25 has two circular disks 30 secured thereon by keys 31, the inner disk being seated against a collar 32 which is secured on the shaft 25 by means of a set screw 33. The two disks 30 which are spaced apart to occupy positions adjacent the end walls of the grinding chamber are connected by two rods or pins 35 which are located in the same plane containing the axis of the shaft 25 and which are located equal distances from that axis. The rods 35 have enlarged heads 35ª which engage the outer side of the inner disk 30 and their forward ends are provided with removable transfer pins 36. Washers 37 are located between the pins 36 and the outer face of the outer disk 30 so that longitudinal play of the rods 35 is prevented. Each rod 35 has a plurality of grinding bars or arms 38 pivotally mounted thereon and spaced apart by means of collars or bushings 39. These grinding arms 38 are mounted to turn freely on the rods 35 but are normally held outwardly by centrifugal force when the shaft and the arms are rotated in the direction indicated by the arrow 40 in Fig. 1.

The rotatable grinding arms 38 are adapted to cooperate with an annular screen 41 made up of a relatively heavy metal plate having a plurality of apertures 42 therein, these apertures being preferably circular in form and distributed throughout the area of the screen. The screen 41 is constructed in the form of a spiral with the inner end thereof seated in a recess 44 in a stationary break bar 45 which extends between the walls 13 and 20, preferably in a position directly above the shaft 25. The bar 45 preferably comprises a plurality of complementary bars or shims 45ª which are located between the inner portion of the bar and the outer casing wall 11, these complementary parts of the bar being secured to the casing by studs 46 which pass through holes in the casing wall and threadedly engage the lower bar section. By this arrangement, one or more of the complementary bar sections 45ª may be removed and replaced by another of different thickness in order to vary the position of the lower bar section and particularly the position of the breaking edge 45ᵇ thereof. The screen 41 has the outer edges of its outer surfaces seated against the inwardly directed flanges of angle bars 47 which are secured to the end wall 13 and to the removable wall 20 by means of rivets 48 and other bars 49 are secured to the wall 13 to engage the inner surfaces of the edge of the screen. The outer edge of the spiral screen 41 is preferably seated in a recess 51 formed in the outer bar section 45ª but the screen merely bears against the flanges of the angle bars 47 so that after the cover 20 has been removed, the screen 41 may be engaged and withdrawn by moving it outwardly parallel to the axis of the shaft 25. To permit the removal of the cover 20 without displacing the shaft 25, the outer end of the shaft is provided with a collar 53 normally secured in place by a detachable transverse pin 54. When the screen 41 is in place in the casing 10, it forms the outer wall of the grinding chamber 15 and a space 55 is thus provided around the screen and around the grinding chamber in which the ground materials collect after passing through the apertures of the screen 41 and thence pass downwardly by gravity through the discharge chute 12.

In the operation of this improved grinding machine, the materials to be ground fall by gravity into the lower part of the grinding chamber 15 and are there engaged by the rotating grinding arms 38 which are free to move rearwardly upon impact with the materials and which tend to carry these materials upwardly against the force of gravity as they travel around the axis of the shaft 25. As the materials are thus carried around they are projected outwardly by centrifugal force and the action of this force coupled with the grinding action of the outer ends of the members 38 serves to pulverize the materials and force the finely divided particles thereof through the apertures 42 of the screen. The heavier particles and those which are not reduced by the cooperating action of the members 38 and the screen 41 are carried upwardly to the upper part of the grinding chamber and the action of centrifugal force causes these particles to be projected into the pocket 56 adjacent the vertical face of the break bar 45. As soon as these particles are lodged in these pockets they tend to return by gravity and are caught by the next series of rotating bars 38, being thereby broken against the breaking edge 45ᵇ of the bar. In this way bones and other hard objects in the materials to be ground are effectively broken against the bar 45 and this impact and breaking action takes place intermittently with the intervening rubbing action on the screen produced by the rotation of the members 38 so that, eventually, all of the materials are reduced to a friable condition and are forced outwardly through the apertures 42 of the screen. As the bar 45 wears off, it may be adjusted downwardly by varying the thickness of the shims 45ª and this may be effected at other times in order to vary the space between the lower edge of the break bar and the outer ends of the grinding arms 38. Any of the parts which are likely to become worn with extended use, such as the arms 38, the bar 45 and the screen 41 may be readily replaced by removing the collar 53 and nuts 23 to permit the detachment of the cover 20 after which the outer disk 30 may be removed to permit access to the arms 38 while at the same time permitting the removal of the screen 41 and the replacement or adjustment of the bar 45.

An important advantage of this invention is that the materials to be ground are fed into the grinding chamber at the end thereof, preferably more or less into the suction area created by the rotation of the grinding elements so that the action of these rotating elements tends to draw the materials into the grinding chamber and there is no tendency of the rotating bars 38 to project the materials out through the feeding hopper as in other forms of grinders employing rotating parts and having the feed hopper arranged to direct the materials through the outer peripheral wall of the grinding chamber. This arrangement of the feeding hopper whereby the materials are directed into the end of the grinding chamber also brings about an improved screening efficiency due to the relatively large screening area arising from the fact that it is possible to extend the screen throughout the periphery of the grinding chamber, whereas in other forms of grinders the screening area is limited by the fact that a large part of the periphery of the grinding chamber is occupied by that of the feeding hopper. The arrangement of the rotating grinding elements in a substantially closed chamber having a central axial inlet and a peripheral discharge of the ground material, is also of advantage due to the blower action set up by the rotating grinding elements which results in the ground materials being more effectively discharged outwardly through the screen and then blown outwardly through the discharge chute 12 which may be directed at any suitable angle to deposit the ground materials at the desired place. When in operation, the shaft 25 is preferably rotated at a relatively high speed, for example, a speed of 1800 to 3000 revolutions per minute depending on the radius of the grinding chamber, so that the effect of the suction at the intake and of the blower action at the discharge outlet will be correspondingly increased. The simplicity of construction which permits all of the movable and stationary grinding elements to be removed readily from the casing, is of advantage not only in permitting the repair and replacement of parts but in allowing the substitution of screens having perforations of different size to suit the character of material being ground. Notwithstanding the fact that the screen has been referred to herein as of "spiral" form, it is preferably not a true spiral but formed on the arc of a circle through about three-quarters of its periphery so that the major portion thereof lies in relatively close proximity to the outer ends of the grinding members 38.

Although one form of the invention has been shown and described by way of illustration, it will be understood that it may be constructed in various other forms within the scope of the appended claims.

I claim:

1. The combination in a grinder of rotary grinding means and a spiral wall surrounding said grinding means and provided with perforations throughout its annular extent, the ends of said spiral wall being spaced apart radially of the grinder, a break bar mounted between said spaced ends, and a casing forming a receiving chamber around said perforated wall.

2. The combination in a grinder of a casing having a grinding chamber therein, means for delivering materials to be ground to the lower part of said chamber, rotary grinding means mounted in said chamber, and stationary grinding means mounted in the upper wall of said chamber and having an inwardly extending surface for cooperating with said rotary grinding means.

3. The combination in a grinder of a casing having a grinding chamber provided with a perforated wall, rotary grinding means mounted in said chamber, a stationary break bar mounted in the upper part of said chamber to cooperate with said rotary grinding means, and means for adjusting vertically the position of said bar.

4. The combination in a grinder of a rotary member, a plurality of grinding arms pivoted on said rotary member, a spiral wall extending around the axis of said rotary member and having perforations therein, and a break bar mounted in said wall to cooperate with said pivoted grinding arms.

5. The combination in a grinder of a rotary member, a plurality of grinding arms pivoted on said member, a spiral outer wall extending around the axis of rotation of said member, and a break bar interposed between the ends of said wall.

6. The combination in a grinder of a rotary member, a plurality of grinding arms pivoted on said member, a spiral outer wall extending around the axis of rotation of said member, and a break bar interposed between the ends of said wall, said break bar being located above the axis of rotation of said member.

7. The combination in a grinder of a casing having end walls, one of said walls being removable, a spiral wall mounted between said end walls to form a grinding chamber, spiral supporting members attached to said end walls for holding said spiral wall in place, and grinding means mounted within said spiral wall.

8. The combination in a grinder of a casing provided with a grinding chamber, rotary grinding means in said chamber, a stationary break bar in the upper part of said chamber, and means for feeding materials to be ground into said chamber transversely to the plane of rotation of said rotary grinding means and below the axis of rotation thereof.

9. The combination in a grinder of a casing having rotary grinding means located therein, a perforated screen extending entirely around said rotary grinding means, and means for feeding materials to be ground into the region within said screen in a direction substantially parallel to the axis of rotation of said grinding means and below the axis of rotation thereof.

10. The combination in a grinder of a rotary grinding means, a surrounding wall having the distance of its inner surface from the axis of said grinding means increasing progressively in the direction of rotation of said grinding means, and means located at the inner end of said surrounding wall forming a shoulder against which materials may be broken by the action of said rotary grinding means.

11. The combination in a grinder of rotary grinding means, a surrounding perforated wall having the distance of its inner surface from the axis of said grinding means increasing progressively in the direction of rotation of said grinding means, a breaking member located between the displaced ends of said perforated wall and forming a shoulder against which materials may be broken by the action of said rotary grinding means, said spiral wall forming a pocket of increasing depth to receive said materials adjacent said shoulder, and means for adjusting said breaking member radially of said rotary grinding means.

12. The combination in a grinder, of a casing having a grinding chamber therein, a rotary grinder mounted in said grinding chamber, a perforated spiral wall extending around said rotary grinder and increasing in radius in the direction of rotation thereof, and means separating the inner and outer ends of said spiral wall and forming a break bar to cooperate with said grinding means.

In testimony whereof, I have subscribed my name.

CARL POPPELMAN.